Patented Apr. 22, 1930

1,755,178

UNITED STATES PATENT OFFICE

DUDLEY H. GRANT, OF MOORESTOWN, NEW JERSEY, ASSIGNOR TO STANDARD OIL DEVELOPMENT COMPANY, A CORPORATION OF DELAWARE

COMPOSITION FOR REPELLING INSECTS

No Drawing. Application filed December 29, 1928. Serial No. 329,314.

This invention relates to insect repellent compositions containing terpinyl esters and will be fully understood from the following description.

I have found that terpinyl esters such as the acetate, propionate, etc. are particularly efficacious in repelling insects of various kinds such as mosquitoes and flies. Such esters have a relatively pleasant odor which is an advantage when they are used as an insect repellent on the human body. The material may be applied to the surface from which the insects are to be repelled in any convenient manner, for example, in admixture with diluents such as light petroleum oils or alcohols, fixatives such as heavy petroleum oils, petrolatum, lanolin, waxes or resins, adjuvants such as pyrethrum extracts, essential oils, etc., emulsifying agents, such as soaps, to permit dilution with water and/or vehicles such as soap jellies, cold cream, vanishing cream, toilet powders, etc. Such compositions are adapted to be poured, smeared, dusted or sprayed on the bodies of human beings or domestic animals or upon the clothing, furniture, carpet, walls, etc.

The proportions of the terpinyl ester may, of course, vary over wide limits, depending upon the duration of the effect desired. As a practical example, it may be stated that 3–10 per cent of terpinyl acetate dissolved in kerosene and sprayed upon a domestic animal, such as a horse or cow, will provide freedom from flies and other insect pests for a period of several hours.

A concentrated emulsifiable composition may be prepared, for example, in the following proportions: 3–10 parts of terpinyl acetate, 20–40 parts of kerosene, 5–20 parts of soap or other emulsifier suitable for subsequent dilution with water, for spraying or sprinkling upon the skin or other surface to be protected from insect attack. The amount of water added may vary considerably.

The following example refers to a composition containing terpinyl acetate with an adjuvant: 5% terpinyl acetate, 95% extract of pyrethrum made with kerosene (1 lb. flowers per gallon of kerosene). This composition is an excellent household spray.

A lotion may be made up in the following proportions: 5% terpinyl acetate, 5% oil of citronella or oil of cedarwood, 3% oil of chenopodium, lavender, spike, thyme or eucalyptus, 87% alcohol (50 to 95% strength).

Terpinyl esters thoroughly admixed with semisolid and/or solid vehicles such as petrolatum, waxes, and the like, are especially adapted to be smeared on human skin as a protection against mosquitoes and flies. The following examples may serve as illustration:

Ointment to apply to the skin: 20% terpinyl propionate, 20% beeswax, 40% petrolatum or lanolin, 20% paraffin wax.

Cheap ointment: 5% terpinyl acetate, 95% petrolatum.

Cream ointment: 5% terpinyl acetate or propionate, 95% cold cream (Ung. Aq. Rosar., U. S. P.) or vanishing cream.

Powder: 5% terpinyl acetate or propionate, 10% magnesium carbonate, light, 15% zinc stearate or magnesium stearate, 15% kaolin, 55% talc.

Instead of using terpinyl acetate in the insect repellent compositions I prefer, in some instances, to acetylate in the usual manner a raw material such as pine oil which contains terpinyl alcohol, thereby forming terpinyl acetate. The use of such acetylated product, instead of the commercial terpinyl acetate lowers the cost of the insect repellent.

I claim:

1. An insect repellent comprising terpinyl ester.

2. An insect repellent comprising terpinyl ester in a mineral oil.

3. An insect repellent comprising terpinyl acetate.

4. An insect repellent comprising 3–10 per cent of terpinyl acetate.

5. An insect repellent comprising terpinyl acetate in a mineral oil.

6. An insect repellent comprising terpinyl acetate, a mineral oil, and an emulsifying agent.

7. An insect repellent comprising terpinyl acetate, pyrethrum extract and kerosene.

DUDLEY H. GRANT.